United States Patent [19]
Blumenfeld et al.

[11] Patent Number: 4,552,579
[45] Date of Patent: Nov. 12, 1985

[54] GLASS FOREHEARTH

[75] Inventors: John F. Blumenfeld, Simsbury; Frank Bubon, Windsor, both of Conn.

[73] Assignee: Emhart Industries, Inc., Farmington, Conn.

[21] Appl. No.: 559,160

[22] Filed: Dec. 7, 1983

[51] Int. Cl.[4] .............................................. C03B 5/235
[52] U.S. Cl. ...................................... 65/346; 65/337; 65/356
[58] Field of Search .......................... 65/346, 356, 337

[56] References Cited
U.S. PATENT DOCUMENTS

| | | | |
|---|---|---|---|
| 1,893,061 | 1/1933 | Peiler | 65/337 |
| 2,282,554 | 5/1942 | Barker | |
| 3,582,310 | 6/1971 | Avery et al. | 65/346 |
| 3,999,972 | 12/1976 | Brax | 65/346 X |
| 4,294,603 | 10/1981 | Winzer et al. | 65/346 |
| 4,494,974 | 1/1985 | Vilk et al. | 65/337 |

Primary Examiner—Arthur Kellogg
Attorney, Agent, or Firm—H. Samuel Kieser

[57] ABSTRACT

A forehearth for the conveyance of molten glass has at least one cooling zone which includes a trough and a roof over the trough. A pair of spaced projections extend downwardly from the roof to define in the space below the roof a central channel over the central portion of the stream of molten glass and side channels over respective side portions of the stream of glass. The roof has at least one area of reduced thickness in the portion over the central channel. An enclosed upper cooling channel extends longitudinally of the forehearth over the area of reduced thickness and has an inlet and an outlet spaced longitudinally from the inlet. Heating means are provided for applying heat to each side portion of the stream of glass.

14 Claims, 10 Drawing Figures

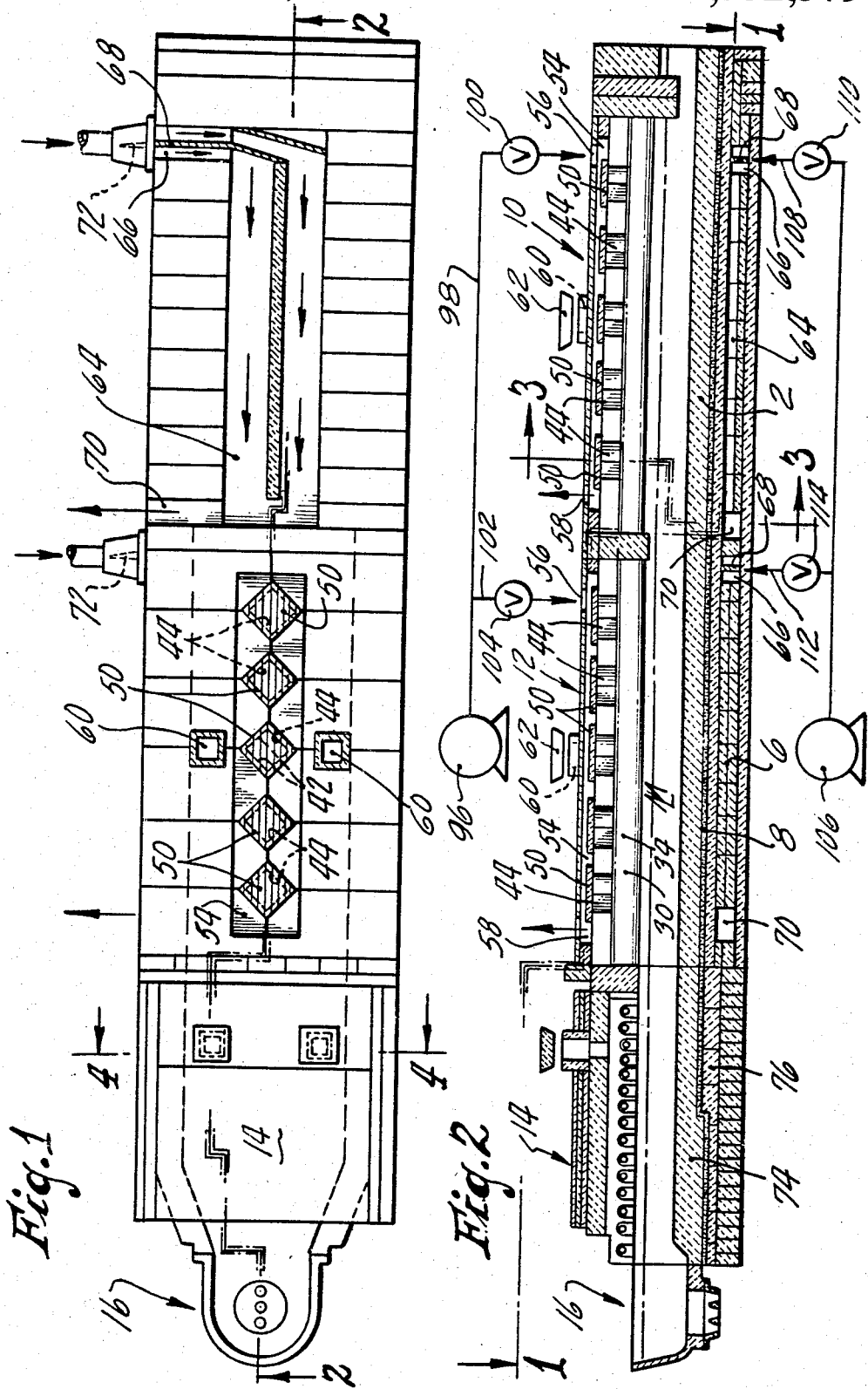

GLASS FOREHEARTH

BACKGROUND OF THE INVENTION

This invention relates generally to a molten glass forehearth of the type used between a glass melting tank or furnace and a feeder bowl, and more particularly relates to a forehearth having improved heating and cooling characteristics.

In the production of glass, molten glass is produced in a glass melting furnace and then passes along a forehearth in a continuous stream to a feeder bowl from which the molten glass is fed in mold charges or gobs into a glassware forming machine. A typical forehearth comprises a refractory trough along which the molten glass flows and which is provided with an insulating roof.

It is known that the temperature of the glass is not homogeneous throughout its cross-section. The glass tends to be cooler at the outside edges and hotter in the central portion due to the cooling effect of the sidewall of the channel. For this reason, heating means such as gas burners, submersible electrodes, or the like are provided in the side of the forehearth to heat the glass. Cooling air may also be blown into the forehearth either transversely or longitudinally of the direction of gas flow. With the proper rates of heating and cooling, homogeneity of the glass temperature across the stream of glass can be improved.

One such arrangement is shown in U.S. Pat. No. 3,999,972, issued Dec. 28, 1976. According to that patent, the forehearth includes a roof having a plurality of longitudinal ridges depending therefrom which define a central longitudinal channel. Heaters are provided in the sidewall of the roof structure to heat portions of the glass stream at the longitudinal edges of the stream and cooling air flows between inlet and outlet ports in the roof over the central portion of the stream of glass in contact with the upper surface of the stream.

However, when there is direct contact of the glass stream with the cooling fluid, there is a possibility that if the glass is cooled too much, a skin forms on the surface of the glass which is in contact with the cooling air. This skin acts as an insulator retaining the heat within the glass beneath it with the result that the glass cannot be properly cooled.

SUMMARY OF THE INVENTION

In view of the above, it is an object of this invention to provide a forehearth of improved design.

Another object of the present invention is the provision of a forehearth having cooling air flowing in a longitudinal direction out of contact with the glass stream.

These and other objects of the present invention may be accomplished, generally speaking, by the provision of a forehearth comprising a trough having a roof thereover, a pair of spaced projections extending downwardly from the roof to define in the space below the roof a central channel over the central portion of the stream of glass and side channels over respective side portions of the stream of glass. The roof has at least one area of reduced thickness in the portion over the central channel. An enclosed cooling channel extends longitudinally of the forehearth over the areas of reduced thickness. Heating means are provided for applying heat to the side portions of the stream of glass.

BRIEF DESCRIPTION OF THE DRAWINGS

FIG. 1 is a horizontal sectional view taken along the lines 1—1 of FIG. 2.

FIG. 2 is a vertical sectional view taken along the lines 2—2 of FIG. 1.

DETAILED DESCRIPTION

Figure 3:
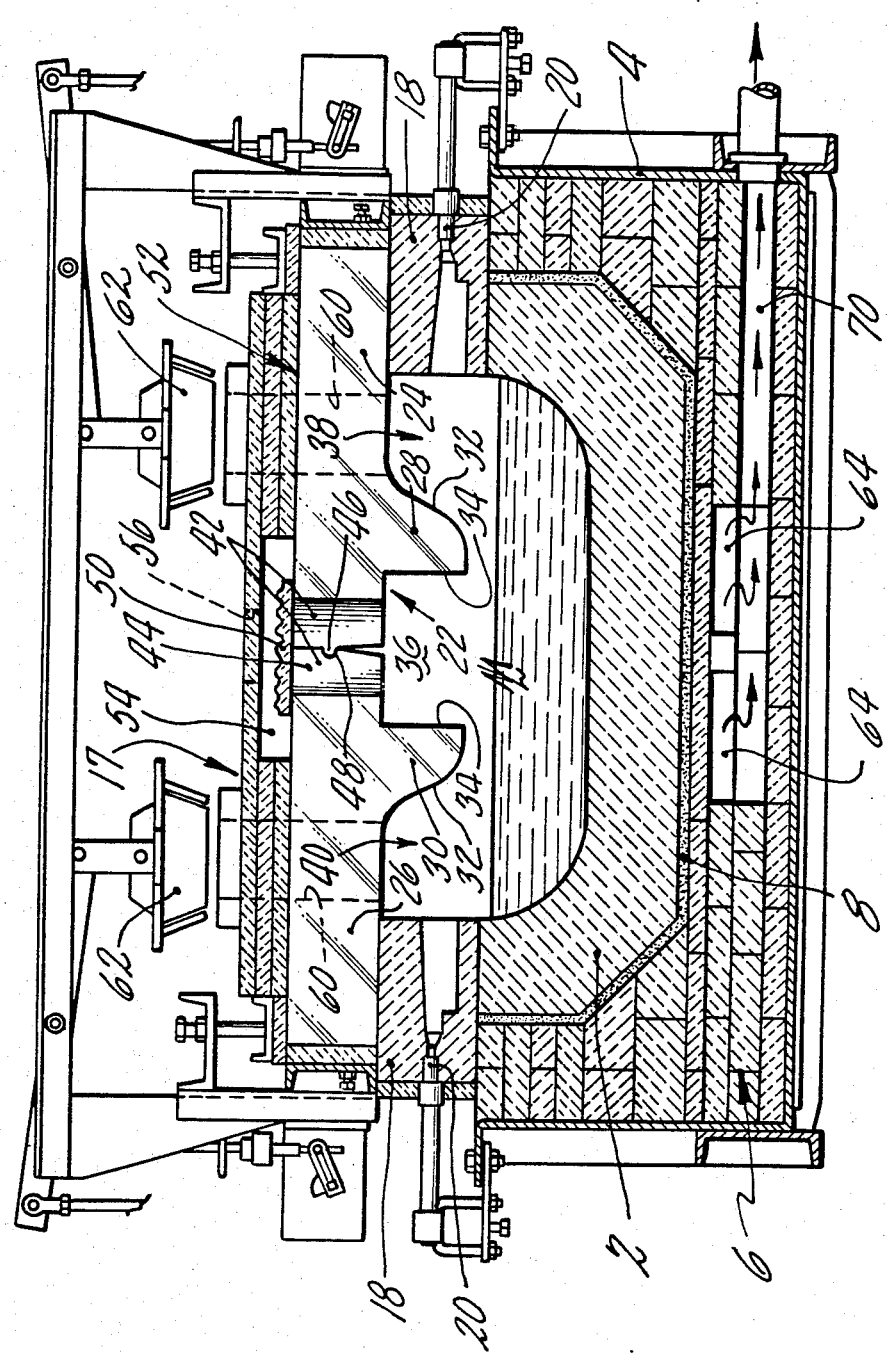
FIG. 3 is a transverse sectional view taken along the lines 3—3 of FIG. 2.

Referring to the drawings and in particular FIGS. 1 2 and 3, a forehearth constructed according to the present invention includes a generally U-shaped channel or trough 2 of refractory material mounted in a metallic support structure 4 with insulating bricks 6 positioned between the trough 2 and support structure 4. A layer 8 of aluminum oxide powder may be positioned between the trough 2 and insulating bricks 4 to enable the trough 2 to be leveled.

As is typical, the forehearth may be made up of a plurality of cooling zones 10 and 12 each of which is substantially identical. As shown in FIG. 2, in the embodiment shown, there are two such cooling zones. An equalizing zone 14 is provided at the forward end of the cooling zone 12 to which a feeder bowl 16 is attached. The molten glass flows in the trough 2 at a level indicated by the line labeled M.L. (metal line).

A roof portion 17 of each cooling zone 10 and 12 includes opposed sides formed by burner blocks 18 in which are mounted burners 20 for heating the glass. As is conventional, these burners 20 are spaced along the length of the cooling zones 10 and 12 on both sides of the forehearth. According to the embodiment shown in FIGS. 1, 2 and 3, the roof portion 17 also includes a plurality of roof blocks 22 laid side by side along the length of the cooling zones 10 and 12 on top of the burner blocks 16 and secured in place by the support structure. Each roof block 22 is formed in two pieces 24 and 26 which have a plane of separation generally in the vertical median plane of the trough 2. The roof blocks 22 have two spaced projections 28 and 30 which extend downwardly toward the glass below the centerline of the burners and longitudinally of the forehearth. Each projection 28 and 30 has a generally arcuate inclined face 32 which faces the burner blocks 18 and a straight side 34 facing the straight side 34 of the other projection. This construction results in three transversely spaced longitudinally extending channels in the underside of the roof structure comprising a central channel 36 over the central portion of the stream of molten glass and side channels 38 and 40 on respective sides of the central channel 36 over respective side portions of the stream of glass.

As viewed particularly in FIG. 1, the roof blocks 22 have a V-shaped cutout 42 in both side edges formed by cutting both corners off the inner end of both pieces 24 and 26 of the roof block 22. When the roof blocks 22 are laid side by side, the mating V-shaped cutouts 42 form a generally square-shaped opening 44 which extend through the blocks 22. The inner end of piece 28 of the roof block 22 includes a raised portion 46 which is adapted to mate in a mating groove 48 in the inner end of the other piece 30 to aid in construction of the roof structure.

Figure 9:
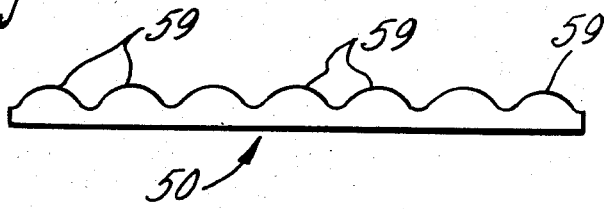
FIG. 9 is an enlarged end view of the closure block provided over the apertures in the roof block.

The longitudinally spaced openings 44 through the roof blocks in communication with the central channel 36 are each covered by a closer block 50 of refractory material having good thermal conductivity. Insulating blocks 52 are provided on top of the roof blocks 22 and are used to form an enclosed longitudinal cooling channel 54 in each cooling zone 10 an 12 having an inlet 56 for the entrance of cooling air and an outlet 58 downstream for the exit of cooling air. Thus the cooling air flows in the direction of flow of the molten glass. However, in some instances it may be desirable to have the cooling air flow in the opposite direction in which case the inlet 56 and outlet 58 would be reversed. The closer block 50 may have its upper surface corrugated as shown in FIG. 9 with the corrugations 59 extending longitudinally to provide an increased surface area for heat transfer.

Each of the cooling zones 10 and 12 has two flue openings 60, one communicating with one side channel 38 and the other communicating with the other side channel 40. Each of the flue openings is fitted with conventional damper blocks 62. Each of the damper blocks 62 is independently adjustable in order to provide the desired degree of draft for operation of the gas burners 20 and provide for the proper exhaustion of the products of combustion.

As stated above, the projections 28 and 30 from the roof blocks 22 extend below the centerline of the burners. Thus, the outside surfaces 32 of the projections 28 and 30 will serve to radiate heat back to the outside edges of the glass to help reduce the temperature gradient. Also, the provision of the covered openings 44 in the roof blocks 22 result in a reduced thickness of the roof portion 17 in longitudinally spaced areas of the roof portion 17 centrally thereof to facilitate the rate of heat transfer from the central channel 36 to the cooling air within the cooling channel 54 without the cooling air being permitted to come in contact with the glass stream.

If desired, bottom cooling may also be provided by forming a divided bottom cooling channel 64 in the insulating blocks 6 below the trough 2 running longitudinally of the forehearth. A transverse channel 66 having a partition 68 therein to provide two flow paths is provided for the inlet of cooling air into the bottom cooling channel 64. Downstream of the inlet channel 64 is a second transverse channel 70 communicating with the cooling channel 64 for the outlet of cooling air. It is to be understood that in some instances it may be desirable for the cooling air to flow in the opposite direction in which case the inlet channel 64 and outlet channel 70 would be reversed. A movable baffle 72 may be provided in the inlet 66 to control the amount of cooling air to the two portions of the divided bottom cooling channel 64.

Figure 4:
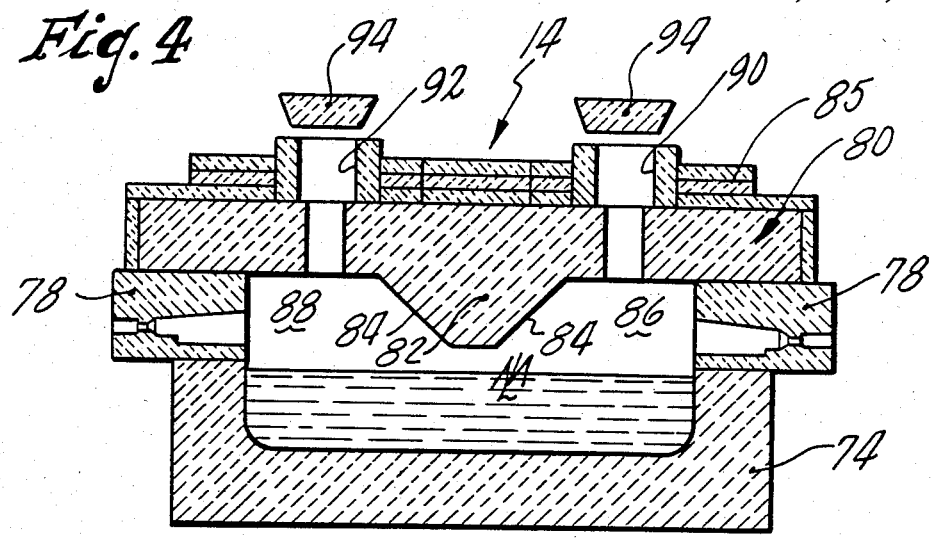
FIG. 4 is a partial transverse sectional view of the equalizing zone of the forehearth taken along the lines 4—4 of FIG. 1.

The equalizing zone 14 does not have any means for cooling the molten glass but it does have means for heating the glass to reheat the surface in the event that it is too cool after it leaves the cooling zone 12. For this purpose, the equalizing zone 14 as shown in FIGS. 2 and 4 includes a generally U-shaped channel or trough 74 member of refractory material mounted in the support structure 4 with insulating blocks 76 between the support structure 4 and the trough 74 in the manner similar to that of the cooling section. Similarly, burner blocks 78 are placed in side by side relationship on top of both edges of the trough in which suitable burners are mounted. A series of roof blocks 80 laid side by side extend transversely across the channel on top of the burner blocks 78. Each roof block 80 comprises a one piece member having a central portion 82 projecting downwardly past the centerline of the burners. The projection 82 is generally triangular in cross-section and thus presents an inclined surface 84 facing each set of burner blocks 78 whereby heat is radiated downwardly to the outer portions of the glass in the trough 74. The projection 82 forms two outside channels 86 and 88 under the roof blocks 80.

Insulating material 85 surrounds the top and sides of the roof blocks 80, however, no cooling channel is formed in this insulation. The roof block and insulation are provided with two flue openings 90 and 92 communicating with the two outside channels 86 and 88 respectively to provide egress for the products of combustion. The flue openings 90 and 92 have conventional independently adjustable damper blocks 94 associated therewith which are adjustable to provide the desired degree of draft for each.

The amount of cooling air to each cooling zone 10 and 12 and to the upper and lower cooling channels 54 and 64 are all independently controlled. For this purpose, an air fan 96 may be provided for providing air to the upper cooling channel 54 from which a line 98 extends having a control valve 100 therein leading to the inlet 56 of the first cooling zone 10 and a separate line 102 with a separate control valve 104 therein leading to the inlet 56 of the second cooling zone 12. Each of the respective control valves 100 and 104 for the upper cooling channels in each of the cooling zones may be controlled by means of a thermocouple (not shown for the sake of clarity) embedded in the top surface of the glass stream adjacent their respective exits.

The cooling air in the bottom channel 64 is controlled by a similar arrangement which includes an air fan 106 having one line 108 with a control valve 110 leading to the inlet 66 of the first cooling zone 10 and a second line 112 with a control valve 114 leading to the inlet 66 of the cooling channel in the bottom of the second cooling zone 12. The valves 110 and 114 may be controlled by means of a thermocouple immersed in the glass stream adjacent the bottom surface thereof at the exits of their respective zones.

Figure 10:
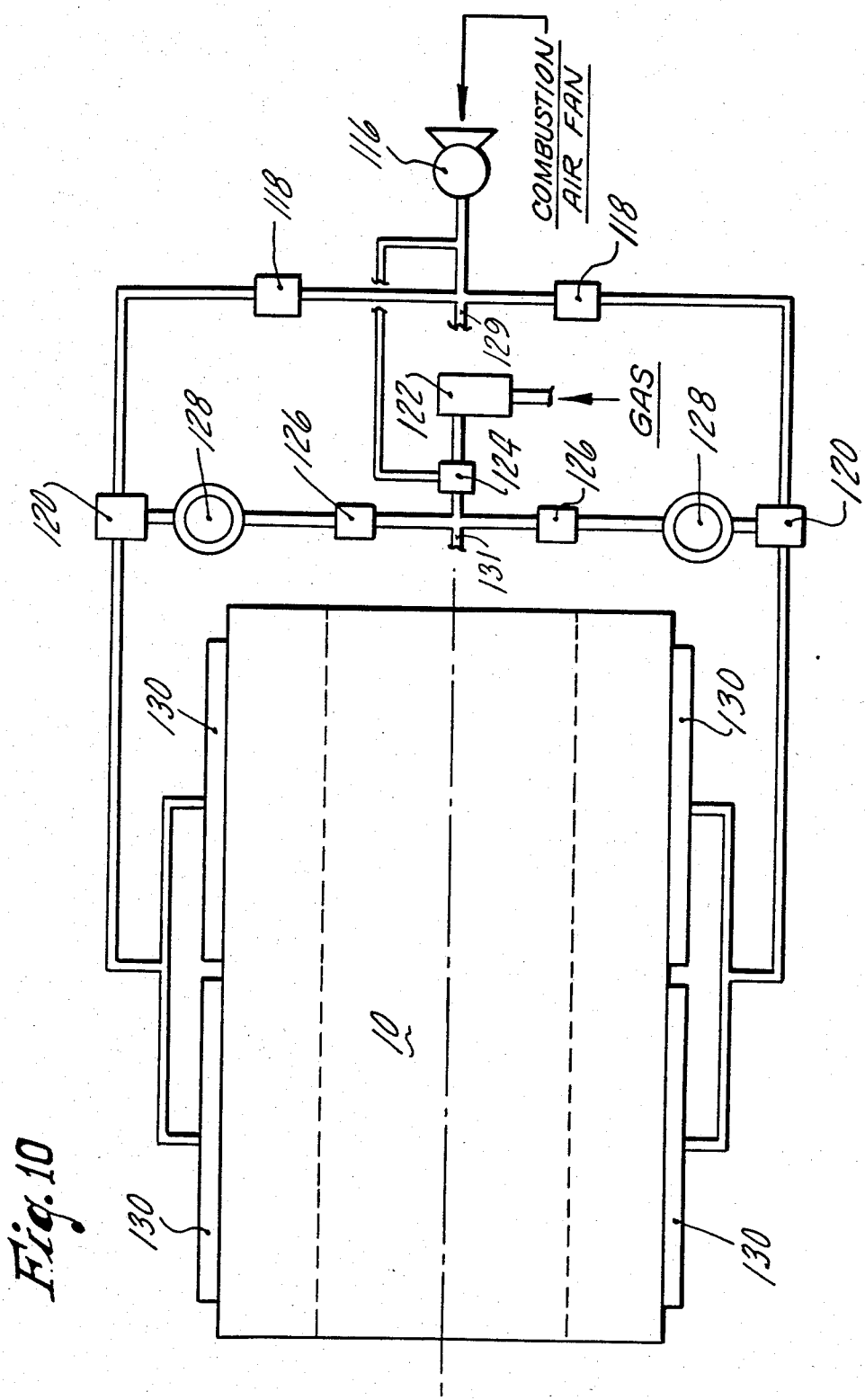
FIG. 10 is a schematic piping diagram for supplying the fuel to the burners.

The temperature of the burners on both sides of the various zones may be individually controlled by means of a system shown in FIG. 10 it being understood that each zone has a separate system. Each side of the forehearth is individually controlled as well as each zone. Combustion air is fed from a fan 116 through temperature control valves 118 associated with a respective side of the forehearth. From the temperature control valves 118, the air is fed to aspirators 120. Gas is fed through a pressure regulator 122 and safety valve 124 through gas cocks 126 associated with each side of the forehearth. The gas cocks 126 are connected through a govenor 128 to the aspirator 120 associated with the respective side of the zone. The mixture then flows from the aspirator 120 through suitable piping into the burner manifolds 130 on each side of the forehearth to which the burners are connected. The conduit 129 and conduit 131 connect the source of combustion air and the source of gas respectively to the control system of other zones. By controlling the temperature control valves 118, the rate of combustion air to the respective side of the respective zone is controlled with the mixture ratio being controlled by the aspirator 120 and thus, the temperature in a given side of the forehearth in a given zone may be controlled.

Figure 5:
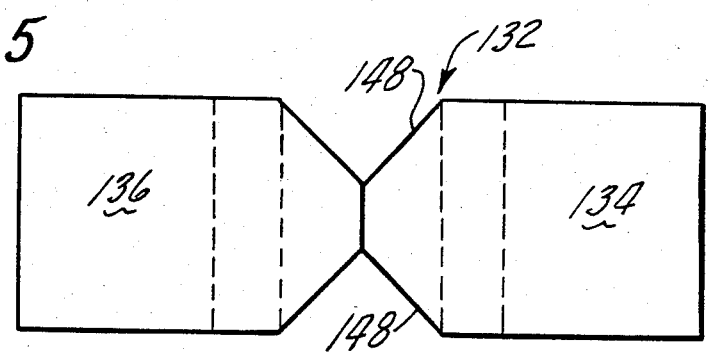
FIG. 5 is a top plan view of an alternative embodiment of a roof block.
Figure 6:
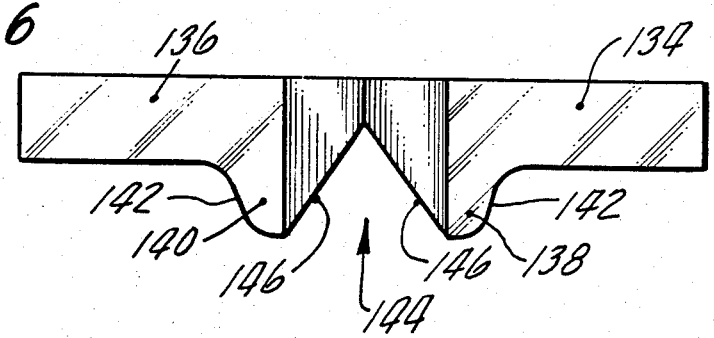
FIG. 6 is a side view of the roof block of FIG. 5.

FIGS. 5 and 6 show an alternative shape of a roof block that may be used in the cooling zone. According to this embodiment, the roof block 132 consists of two pieces, 134 and 136 each of which has a downwardly extending projection 138 and 140. The portion 142 of each projection 138 and 140 facing outwardly or toward the burner blocks is generally inclined and arcuate and the portion of each piece defining the central channel 144 also includes an inclined surface 146 so that the central channel is generally in the shape of an inverted "V" opening toward the glass stream. The sidewalls of the block 132 include V-shaped notches 148 in the central portion thereof so that when the burner blocks 132 are laid in side by side relationship along the length of the forehearth, openings are formed in the roof blocks which are covered by closer blocks 50 as described in connection with the previous embodiment.

Figure 7:
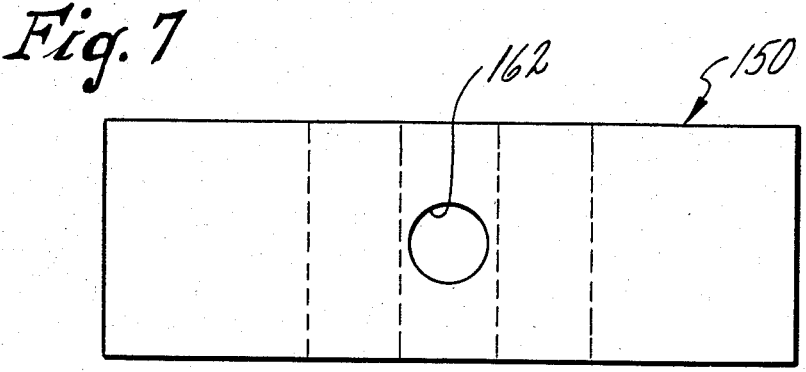
FIG. 7 is a top plan view of another embodiment of a roof block.
Figure 8:
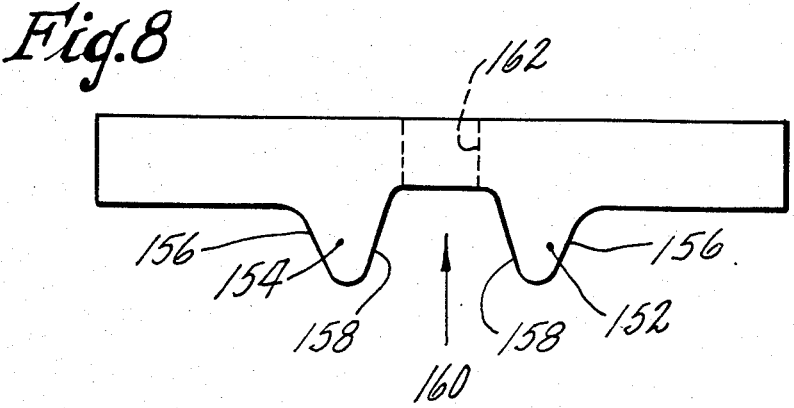
FIG. 8 is a side view of the roof block shown in FIG. 7.

FIGS. 7 and 8 show an additional embodiment of a roof block. In this case, the roof block 150 is a unitary member extending across the channel and includes two spaced downwardly extending projections 152 and 154 which extend below the centerline of the burner. The surface 156 of the projections facing the outward or toward burner blocks is tapered downwardly and inwardly while the surfaces 158 forming the central channel 160 has a taper upper and inwardly. A round opening 162 is provided in the roof block 150 in the central portion thereof. The opening 162, when the roof block is positioned on the burner blocks, in the forehearth is closed with a closer block 50 as previously described.

With the above described construction, a forehearth is constructed in which the central portion of the glass stream is cooled by longitudinally flowing cooling air which does not contact the glass. The cooling air in each zone is independently controlled. Heating means is provided in each side of the forehearth for heating the outside portions of the glass stream. The heating means on each side in each zone is independently controlled. The heating means may comprise gas burners as specifically described above, or may include electrodes extending into the glass stream and spaced at proper intervals along the length of the forehearth so that the current flow results in preferential heating of the glass along the edges. longitudinal. Bottom cooling of the central portion of the glass stream is also provided which is independently controlled.

While reference has been made above to various embodiments of this invention, various modifications and alterations will readily suggest themselves to those skilled in the art. Accordingly, the scope of this invention should be ascertained by reference to the following claims.

What is claimed is:

1. A forehearth for the conveyance of molten glass having at least one cooling zone, said cooling zone including a trough, a roof over said trough, a pair of spaced projections extending downwardly from the roof to define in the space below the roof a central channel over the central portion of the stream of molten glass and side channels over respective side portions of the stream of glass, said roof having at least one area of reduced thickness in the portion over the central channel, an enclosed upper cooling channel extending longitudinally of the forehearth over the area of reduced thickness and having an inlet and an outlet spaced longitudinally from said inlet, and heating means for applying heat to each side portion of the stream of glass.

2. The forehearth of claim 1 wherein said at least one cooling zone includes a longitudinally extending bottom cooling channel beneath the trough having an inlet and an outlet spaced longitudinally from said inlet.

3. The forehearth of claim 2 in which there is a plurality of cooling zones, and the cooling air in each of said upper cooling channels is independently controlled, and the cooling air in each of said bottom channels is independently controlled independently of the control of said cooling air in said upper channel.

4. The forehearth of claim 1 wherein said at least one cooling zone includes a flue opening into each of said side channels, and adjustable damper means for each of said flue openings.

5. The forehearth of claim 1 wherein the heating means for each side portion of the glass is independently adjustable.

6. The forehearth of claim 1 wherein said roof includes a plurality of roof blocks laid side by side over said trough, said reduced areas being formed by openings through said roof blocks and a closer block covering said opening, said projection extending downwardly from said roof blocks.

7. The forehearth of claim 6 wherein said upper cooling channel is defined by insulating material on top of said roof blocks.

8. The forehearth of claim 6 wherein each said roof block is formed in two pieces.

9. The forehearth of claim 6 wherein each said roof block is a unitary structure having an opening in its central section.

10. The forehearth of claim 6 wherein each said roof block has a cutout in its side wall to mate with a cut out in the adjacent block to form the opening.

11. In a forehearth for the conveyance of a stream of molten glass, an equalizing zone including a trough, a roof over said trough, a longitudinally extending central projection extending downwardly from said roof toward said stream of glass in said trough, said projection being positioned over the central portion of said trough and defining two outside channels, said outside channels having an upper surface spaced from the stream of glass a greater distance than said central projection whereby said projection defines two spaced apart heat radiating compartments, and means for heating the stream of glass under each of the outside channels.

12. The forehearth of claim 11 in which said projection is generally triangularly shaped.

13. The forehearth of claim 12 in which the equalizing zone has a flue opening into each of said channels, and including adjustable damper means for each flue openings, and the means for heating the glass in each channel being individually controlled.

14. The forehearth of claim 11 in which the projection extends downwardly past the centerline of the heating means.

* * * * *